United States Patent [19]

Tolonen

[11] 4,453,535
[45] Jun. 12, 1984

[54] SOLAR ENERGY STRUCTURE

[75] Inventor: William J. Tolonen, Bartlesville, Okla.

[73] Assignee: Phillips Petroleum Company, Bartlesville, Okla.

[21] Appl. No.: 318,776

[22] Filed: Nov. 6, 1981

[51] Int. Cl.³ .............................................. F24J 3/02
[52] U.S. Cl. .................................. 126/444; 126/450; 126/901
[58] Field of Search .............. 126/444, 445, 449, 901, 126/450, 417

[56] References Cited

U.S. PATENT DOCUMENTS

| 2,710,274 | 6/1955 | Kuehl | 126/901 |
|---|---|---|---|
| 3,215,134 | 11/1965 | Thomason | 126/444 |
| 3,815,574 | 6/1974 | Gaydos, Jr. | 126/271 |
| 3,875,925 | 4/1975 | Johnston | 126/449 |
| 3,968,786 | 7/1976 | Spielberg | 126/901 |
| 3,974,822 | 8/1976 | Patil | 126/271 |
| 4,026,270 | 5/1977 | Ramey | 126/428 |
| 4,026,272 | 5/1977 | Bottum | 126/271 |
| 4,047,518 | 9/1977 | Anderson | 126/432 |
| 4,082,082 | 4/1978 | Harvey | 126/449 |
| 4,144,875 | 3/1979 | Bruno | 126/447 |
| 4,265,222 | 5/1981 | Kapany | 126/444 |
| 4,267,821 | 5/1981 | Nelson | 126/444 |
| 4,307,706 | 12/1981 | Parker | 126/417 |

Primary Examiner—Daniel J. O'Connor

[57] ABSTRACT

A method and device for collecting solar energy comprising a sandwich composed essentially of two layers of solar ray transmitting material having disposed therebetween a black body or layer, e.g., paving grade asphalt, the sandwich being housed in a structure permitting flow of heat transfer or collecting medium over substantially the entire faces of the sandwich.

2 Claims, 1 Drawing Figure

SOLAR ENERGY STRUCTURE

BRIEF DESCRIPTION OF THE INVENTION

A solar heat collector has disposed therein a heat absorption film composed of a layer of black body, e.g., paving grade asphalt sandwiched between two transparent plates, e.g., plastic, glass, quartz, etc. Means are provided for passing heat transfer or collecting fluid across substantially 100% of the two faces of the heat absorption film.

BRIEF DESCRIPTION OF THE DRAWING

The drawing shows a flat box-like structure of rectangular shape to be placed advantageously to collect solar energy. Within the box there is disposed a heat collecting material, e.g., paving grade asphalt supported on two sides by a transparent sheet, forming a sandwich, the asphalt being the "meat" in the sandwich. Heat collecting medium, that is heat transfer fluid, is passed over the entire surface of both sides of the sandwich thus making use of all heat contained therein as collected thereby. A double walled exposure surface is provided producing a dead air space within the walls, thus to collect into the structure solar energy and to relay the same to the sandwich. There is also provided behind the sandwich to reflect to the sandwich heat rays passing therethrough a metal or plastic material to reflect back whatever heat has escaped the heat transfer fluid into said fluid.

DETAILED DESCRIPTION

Figure 1:
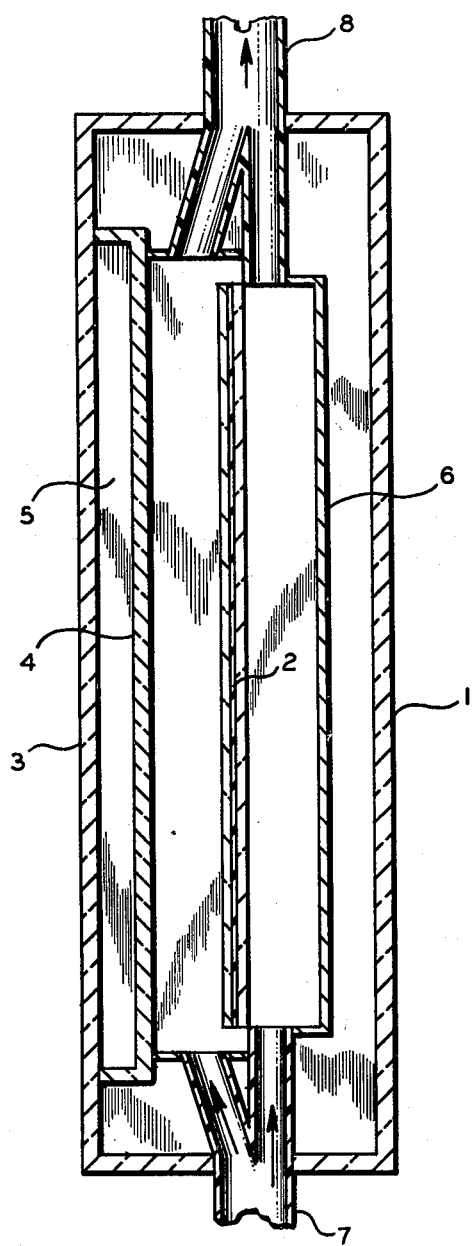

This invention relates to the collection of solar energy. In one of its aspects it relates to the provision of a solar energy device. In another of its aspects it relates to a method for collecting solar energy.

In one of its concepts the invention provides a solar energy collector having disposed therein a layer of heat generating or collecting material, e.g., black material such as paving grade asphalt and means to pass heat collecting or heat transfer fluid or meduim over substantially the entire faces of the sandwich.

In one embodiment, the sandwich is composed of substantially flat pieces of plastic or glass or similar material adapted to transmit solar rays.

In another of its concepts, the invention provides a method which comprises exposing a solar collecting sandwich to solar rays and passing heat transfer fluid or collecting fluid over substantially the entire surfaces of the faces of the sandwich.

In a further concept of the invention, a backing adapted to reflect solar energy back into the heating medium is provided so that energy which has passed through the sandwich and through the heating medium is in effect reflected back into the heating medium.

Accordingly, an object of this invention is to provide a solar collector.

It is another object of this invention to provide a method for collecting solar energy.

It is a further object of this invention to provide a solar energy means and method wherein full use is made of a heat generating or collecting film albeit only one side thereof is exposed toward incoming solar energy in a solar energy collector.

Other aspects, concepts, objects, and the several advantages of the invention are apparent from a study of this disclosure, the drawing, and the appended claims.

According to the present invention, there is provided a solar collector wherein the heat generating or collecting surface is composed of at least two layers of a suitable plastic having high transmittance and high heat resistance or glass or quartz having sandwiched therebetween a black heat collecting or generating medium, e.g., paving grade asphalt.

Also, according to the invention, there is provided a method for collecting solar energy by exposing such a sandwich to a heat transfer or collecting medium by passing said medium across substantially the entire faces or surfaces of the sandwich.

One skilled in the art in possession of this disclosure having studied the same will be able to supply for the structure thereof a suitable black or heat absorbing or generating medium with which to construct the same. A paving grade asphalt such as 40/50 penetration grade can be used in one embodiment of the invention. Other suitable heat absorption materials that can be used include black paint, green paint, sanded black plastics, and the like.

Suitable plastic materials that can be used for the solar collector that possess high transmittance and high heat resistance include polyolefins such as polypropylene and polybutene, polycarbonate, silicon plastics, polymethylmethacrylate, and the like.

Referring now to the DRAWING, there is shown, in cross section, a solar collector device 1 having supported therein a sandwich 2 according to the invention. The solar collector should be positioned facing the sun within ±20 degrees to the sun's rays for best results and most efficient heat transfer. A transparent plastic or glass face 3 is backed at some distance therefrom by a transparent glass or plastic plate or boundary 4, thus creating a dead air space 5. There is provided to the back side of the sandwich a metal or plastic heat reflecting material 6. As shown, heating medium enters from below the structure at 7 and exiting at 8. The sandwich 2 is so suspended within the enclosure through which the heating medium flows as to cause the heating medium to flow over substantially the entire faces of the sandwich.

According to the invention, the proportion of heating medium passed to the front and to the back sides, respectively, of the sandwich will be adjusted for maximum efficiency. As one skilled in the art will understand, a substantial proportion of the total heat available will be collected by the front face of the sandwich although some will pass therethrough into the heating medium flowing therebehind.

Thus, in operation the sun's rays will enter through plate 3 passing through dead air space 5 and through plate 4 thus initiating heat transfer into the flowing heat transfer or collecting medium. A very considerable proportion of the heat contained with the rays will be released at the sandwich containing the black body, e.g., asphalt. Some of the heat from the sandwich will pass into the heat collecting medium of both sides thereof. However, some heat or solar energy will pass through to be reflected back into the heat collecting medium by plate 6.

It will be seen that in operation substantially 100% of the faces of the sandwich are bathed in heat collecting or transfer medium.

As one skilled in the art in possession of this disclosure having studied the same will understand though that a rectilinear collector has been shown and it can be shaped variously to efficiently produce solar energy.

Thus, for example, the entire device can be curved and can be given a shape approximating a parabola or other shape to concentrate the solar rays to the sandwich. Such a structure can be particularly advantageous in an area where space is at a premium or where it is difficult or unwarranted to provide a mechanism for causing the collector to follow the sun, so to speak.

The actual shape of the sandwich can be varied. For example, it is possible to depart from the rectilinear or planar construction of the sandwich as by producing various bends or corrugations therein to increase its surface area or the surface area obtainable within limited space.

Reasonable variation and modifaction are possible within the scope of the foregoing disclosure, the drawing, and the appended claims to the invention the essence of which is that there has been provided a solar collector and method comprising the use, as described, of a "sandwich" also as described in a structure or zone as described wherein the heat collecting or transfer medium is flowable in direct contact with 100% of the surface area of the sandwich or heat absorbing film.

I claim:

1. A solar collector structure comprising a sandwich comprised of two transparent plates having therebetween a black body heat absorbing film wherein said sandwich is housed within said structure having means adapted to pass heat collecting or transfer medium substantially over the entire outside surface of said sandwich and wherein there is provided as one wall of said structure a conduit for passing said heat transfer or collecting medium in contact with the outside surface of said sandwich and a transparent film which permits the sun's rays to enter into said structure and to pass through said medium to said sandwich and wherein there is disposed for at least a portion of said conduit to the side of said sandwich facing away from the sun reflecting wall to reflect heat back into said collecting medium, said solar collector structure further including first and second front walls comprising a dead air space, inlet means at one end of said housing which divides into two flow paths for allowing fluid flow behind and in front of the sandwich structure, outlet means for withdrawing fluid from said housing, at least a portion of said inlet and outlet means being attached to a means extending from said dead air space chamber and at least a further portion of said inlet and outlet means being attached to a means extending from said reflecting wall.

2. A collector according to claim 1 wherein said black body is a paving grade asphalt.

* * * * *